(12) United States Patent
Chen et al.

(10) Patent No.: US 12,149,177 B2
(45) Date of Patent: Nov. 19, 2024

(54) CONVERTERS AND CONTROL METHODS OF ZERO-VOLTAGE SWITCHING AND QUASI-RESONANT SWITCHING

(71) Applicant: Hangzhou MPS Semiconductor Technology Ltd., Hangzhou (CN)

(72) Inventors: Xuefeng Chen, Hangzhou (CN); Hui Li, Hangzhou (CN)

(73) Assignee: Hangzhou MPS Semiconductor Technology Ltd., Zhejiang (CN)

( * ) Notice: Subject to any disclaimer, the term of this patent is extended or adjusted under 35 U.S.C. 154(b) by 142 days.

(21) Appl. No.: 17/956,442

(22) Filed: Sep. 29, 2022

(65) Prior Publication Data

US 2023/0188046 A1 Jun. 15, 2023

(51) Int. Cl.
*H02M 3/335* (2006.01)
*H02M 1/00* (2006.01)
*H02M 1/08* (2006.01)

(52) U.S. Cl.
CPC ..... *H02M 3/33515* (2013.01); *H02M 1/0009* (2021.05); *H02M 1/08* (2013.01)

(58) Field of Classification Search
CPC ............. H02M 3/335; H02M 3/33515; H02M 1/0009; H02M 1/08
See application file for complete search history.

(56) References Cited

U.S. PATENT DOCUMENTS

| | | |
|---|---|---|
| 2022/0103078 A1 | 3/2022 | Fan et al. |
| 2022/0209665 A1 | 6/2022 | Li et al. |
| 2022/0209676 A1 | 6/2022 | Li et al. |
| 2023/0188033 A1* | 6/2023 | Chen ................. H02M 1/0054 363/21.01 |
| 2023/0188046 A1* | 6/2023 | Chen ..................... H02M 1/08 363/89 |
| 2024/0113629 A1* | 4/2024 | Chen ................. H02M 1/0058 |
| 2024/0113630 A1* | 4/2024 | Chen ................ H02M 3/33592 |
| 2024/0113632 A1* | 4/2024 | Li ..................... H02M 3/33553 |

* cited by examiner

*Primary Examiner* — Adolf D Berhane
(74) *Attorney, Agent, or Firm* — Perkins Coie LLP (57) ABSTRACT

A control method of a zero-voltage switching converter with quasi-resonant control, the converter has a first switch and second switch respectively coupled to a primary winding and an auxiliary winding. The control method is: generating a hysteresis feedback signal based on an output feedback signal indicative of an output signal of the converter; comparing the hysteresis feedback signal with a ramp signal and generating a first comparison signal; comparing the output feedback signal with the ramp signal and generating a second comparison signal; generating a target locked valley number based on a valley pulse signal indicative of valleys of a voltage drop across the second switch, the first and second comparison signals; generating a turning on control signal corresponding to the target locked valley number for the second switch; and providing a control signal to turn on the first switch after turning off the second switch.

20 Claims, 10 Drawing Sheets

CONVERTERS AND CONTROL METHODS OF ZERO-VOLTAGE SWITCHING AND QUASI-RESONANT SWITCHING

CROSS-REFERENCE TO RELATED APPLICATIONS

This application claims the benefit of CN application 202111508359.6 filed on Dec. 10, 2021, and incorporated herein by reference.

TECHNICAL FIELD

The present invention generally relates to electronic circuits, and more particularly but not exclusively, to switching converters and control methods of zero-voltage switching and quasi-resonant switching.

BACKGROUND

The switching converters with quasi-resonant control work under critical current mode or discontinuous current mode, when a current flowing through an energy storage component decreases to zero, the energy storage component resonates with a parasitic capacitance of a power switch. The power switch is turned on when a voltage drop VDS across the power switch reaches its resonant valley (i.e., valley point of the voltage drop VDS during resonance), which is called valley switching, so as to reduce the switching loss. However, some switching converters with quasi-resonant control in the art could generate audio noise and/or discontinuous output power, due to the valley jumping back and forth between two adjacent valleys through loop adjustment.

Besides, to keep up with a higher demand of power density, the switching converters are required to provide a much higher switching frequency. However, as the switching frequency increases, the switching losses of the power switch increase proportionally, and thus hindering the converter performance.

Accordingly, it is desired to further implement soft switching technique for improving the converter efficiency with a high switching frequency.

SUMMARY

Embodiments of the present invention are directed to controllers used in a switching converter with zero-voltage switching and quasi-resonant switching. The switching converter has a transformer, a first switch coupled to a primary winding of the transformer, a second switch coupled to an auxiliary winding of the transformer. The controller comprises an output feedback circuit, a hysteresis feedback circuit, a first comparison circuit, a second comparison circuit, a valley detection circuit, a turn-on control circuit and a primary turn-on control circuit. The output feedback circuit is configured to receive an output signal of the switching converter and generate an output feedback signal. The hysteresis feedback circuit is configured to generate a hysteresis feedback signal based on the output feedback signal. The first comparison circuit is configured to compare the hysteresis feedback signal with a ramp signal and generate a first comparison signal. The second comparison circuit is configured to compare the output feedback signal with the ramp signal and generate a second comparison signal. The valley detection circuit is configured to provide a valley pulse signal in response to one or more valleys of a voltage drop across the second switch during an OFF state of the second switch. The turn-on control circuit is configured to generate a target locked valley number based on the valley pulse signal, the first comparison signal, the second comparison signal and a current locked valley number, and is further configured to generate a turning on control signal corresponding to the target locked valley number for turning ON the second switch. The primary turn-on control circuit is configured to provide a primary turning on control signal to turn on the first switch after the second switch is turned off.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

For switching converters, quasi-resonant switching is a good technique for improving converter efficiency, but performance can be further improved to allow zero-voltage switching operation at the same time. In the following descriptions, a flyback converter, is used as an example to explain the working principle of the present invention. However, persons skilled in the art can recognize that it is not intended to limit the invention. The present invention may be applied to any other suitable switching converters.

Figure 1:
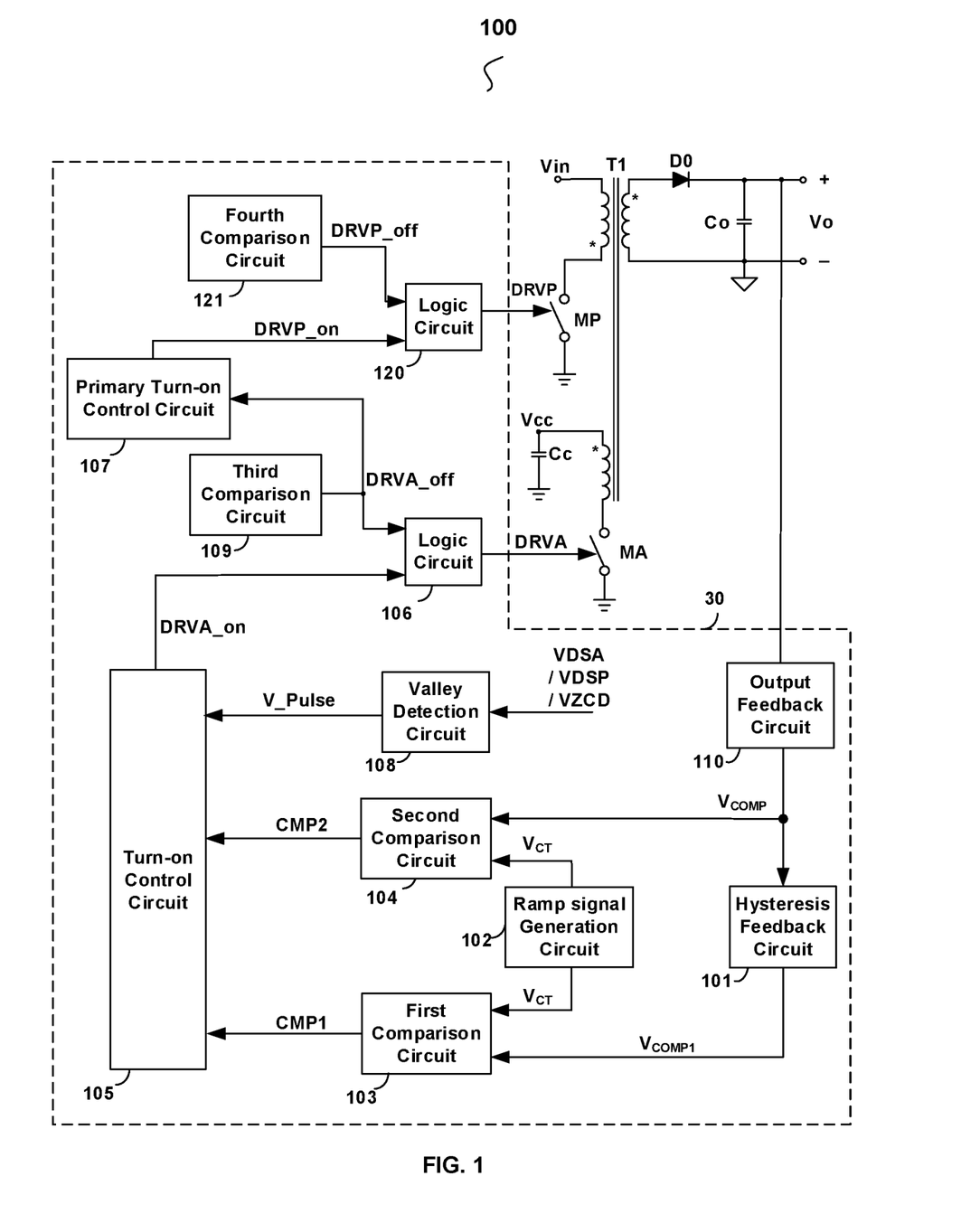
FIG. 1 illustrates a block diagram of a switching converter 100 in accordance with an embodiment of the present invention.

FIG. 1 illustrates a block diagram of a switching converter 100 in accordance with an embodiment of the present invention. As shown in FIG. 1, the switching converter 100 comprises a transformer T1, a primary switch MP coupled to a primary winding of the transformer T1, an auxiliary switch MA coupled to an auxiliary winding of the transformer T1, a diode DO, a power capacitor Cc coupled to the auxiliary winding, an output capacitor Co and a controller 30. A first terminal of the primary winding is configured to receive an input voltage Vin, a first terminal of the secondary winding is configured to provide a DC output voltage Vo through the diode DO, a second terminal of the secondary winding is coupled to a secondary ground. The primary switch MP is coupled between a second terminal of the primary winding and a primary ground. A first terminal of the auxiliary winding is coupled to the power capacitor Cc and the auxiliary switch MA is coupled between a second terminal of the auxiliary winding and the primary ground. The auxiliary switch MA is configured to discharge the parasitic capacitance of the primary switch MP before the primary switch MP is turned on.

As shown in FIG. 1, the controller 30 comprises an output feedback circuit 110, a hysteresis feedback circuit 101, a ramp signal generation circuit 102, a first comparison circuit 103, a second comparison circuit 104, a turn-on control circuit 105, a logic circuit 106 and a primary turn-on control circuit 107. The controller 30 receives an output signal (e.g. output voltage, output current or output power) of the switching converter 100 and generates a primary control signal DRVP to control the primary switch MP based on the output signal, to convert the input voltage Vin into the output voltage Vo.

In the embodiment shown in FIG. 1, the output feedback circuit 110 is configured to generate an output feedback signal $V_{COMP}$ indicative of the output signal of the switching converter 100. In one embodiment, the output feedback circuit 110 generates the output feedback signal $V_{COMP}$ based on an output voltage Vo of the switching converter 100. In some embodiments, the output feedback circuit 110 includes a voltage divider coupled to receive the output voltage Vo, and an error amplifying circuit which proportionally integrates the error between the signal generated by the voltage divider and a reference voltage. In other embodiments, the output feedback circuit 110 utilizes a conventional three-terminal regulator and an impedance network to obtain the output feedback signal $V_{COMP}$. In one embodiment, the output feedback circuit 110 may include an isolation device such as an optocoupler or the like.

As shown in FIG. 1, the hysteresis feedback circuit 101 has an input terminal coupled to receive the output feedback signal $V_{COMP}$, and is configured to generate a hysteresis feedback signal $V_{COMP1}$ based on the output feedback signal $V_{COMP}$. In one embodiment, the hysteresis feedback circuit 101 generates a first hysteresis voltage VHys based on the output feedback signal $V_{COMP}$, and provides the hysteresis feedback signal $V_{COMP1}$ by adding the first hysteresis voltage VHys onto the output feedback signal $V_{COMP}$. In another embodiment, the hysteresis feedback circuit 101 provides the hysteresis feedback signal $V_{COMP1}$ by subtracting the first hysteresis voltage VHys from the output feedback signal $V_{COMP}$. In yet another embodiment, the hysteresis feedback signal $V_{COMP1}$ is proportional to the output feedback signal $V_{COMP}$ and the proportionality coefficient is greater than or less than one. It is noted that the first hysteresis voltage VHys is independent of a resonant period of a voltage drop VDSA across the auxiliary switch MA during an OFF state of the auxiliary switch MA. In a further embodiment, the hysteresis feedback circuit 101 is configured to receive the input voltage Vin and/or an input line voltage of the switching converter 100, and to provide the first hysteresis voltage VHys based on the input voltage information.

The first comparison circuit 103 has a first input terminal coupled to the ramp signal generation circuit 102 to receive a ramp signal $V_{CT}$ and a second input terminal coupled to the hysteresis feedback circuit 101 to receive the hysteresis feedback signal $V_{COMP1}$. The first comparison circuit 103 is configured to compare the hysteresis feedback signal $V_{COMP1}$ with the ramp signal $V_{CT}$ and provide a first comparison signal CMP1 at an output terminal. The second comparison circuit 104 is coupled to the ramp signal generation circuit 102 and the output feedback circuit 110, is configured to compare the output feedback signal $V_{COMP}$ with the ramp signal $V_{CT}$ and provide a second comparison signal CMP2 at an output terminal.

In the embodiment shown in FIG. 1, the controller 30 further comprises a valley detection circuit 108. The valley detection circuit 108 is configured to detect one or more valleys of a voltage drop VDSA across the auxiliary switch MA during the OFF state of the auxiliary switch MA and generate a valley pulse signal V_Pulse at an output terminal. In one embodiment, the valley detection circuit 108 is configured to detect whether the voltage drop VDSA is below a valley threshold voltage during the OFF state of the auxiliary switch MA, and provide the valley pulse signal V_Pulse based on the detection. In another embodiment, during the OFF state of the auxiliary switch MA, the valley detection circuit 108 is coupled to a second auxiliary winding of the transformer T1 to receive a reflected voltage VZCD and to detect whether the reflected voltage VZCD is less than a reflected threshold voltage, and provide the valley pulse signal V_Pulse at the output terminal.

The turn-on control circuit 105 has a first input terminal, a second input terminal, a third input terminal and an output terminal. Wherein the first input terminal is coupled to the first comparison circuit 103 to receive the first comparison signal CMP1, the second input terminal is coupled to the second comparison circuit 104 to receive the second comparison signal CMP2, the third input terminal is coupled to the valley detection circuit 108 to receive the valley pulse signal V_Pulse. Based on the first comparison signal CMP1, the second comparison signal CMP2, the valley pulse signal V_Pulse and a current locked valley number V_LOCK(n−1), the turn-on control circuit 105 determines a target locked valley number V_LOCK(n) for next turning-on, and provides a turning-on control signal DRVA_on corresponding to the target locked valley number V_LOCK(n), to turn ON the auxiliary switch MA.

In one embodiment, the turn-on control circuit 105 is configured to compare a first designated valley number with the current locked valley number V_LOCK(n−1), and to determine whether to increase the target locked valley number V_LOCK(n) based on the comparison result.

Wherein the first designated valley number is the valley number when the ramp signal $V_{CT}$ decrease to reach the hysteresis feedback signal $V_{COMP1}$. In a further embodiment, the turn-on control circuit 105 is configured to compare a difference between a second designated valley number and the current locked valley number V_LOCK(n−1) with a predetermined value m, and to determine whether to decrease the target locked valley number V_LOCK(n) based on the comparison result. Wherein the second designated valley number is the valley number when the ramp signal $V_{CT}$ decrease to reach the output feedback signal $V_{COMP}$, and the predetermined value m is an integer number greater than 1.

In the embodiment shown in FIG. 1, the controller 30 still further comprises a third comparison circuit 109, a fourth comparison circuit 121 and a logic circuit 120. The third comparison circuit 109 is configured to compare a first current sensing signal CS1 indicative of a first current flowing through the auxiliary switch MA and a first threshold voltage Iref1, and generate a turning OFF control signal DRVA_off at an output terminal, for turning off the auxiliary switch MA.

The logic circuit 106 is coupled to the turn-on control circuit 105 to receive the tuning on control signal DRVA_on and is coupled to the third comparison circuit 109 to receive the turning off control signal DRVA_off. Based on the turning on control signal DRVA_on and the turning off control signal DRVA_off, the logic circuit 106 provides a control signal DRVA for controlling the auxiliary switch MA. The primary turn-on control circuit 107 is configured to provide a primary turning on control signal DRV P_on, to turn ON the primary switch MP after detecting the turning-off of the auxiliary switch MA. The fourth comparison circuit 121 is configured to compare a second current sensing signal CS2 indicative of a second current flowing through the primary switch MP with a second threshold voltage Iref2, and provide a primary turning off control signal DRVP_off at an output terminal for turning off the primary switch MP. The logic circuit 120 is configured to provide a primary control signal DRVP for controlling the primary switch MP based on the primary turning-on control signal DRVP_on and the primary turning-off signal DRVP_off.

According to the embodiments of the present invention, the primary switch MP coupled to the primary winding of the transformer T1 is controlled to work in zero voltage switching, while the auxiliary switch MA coupled to the auxiliary winding of the transformer T1 is controlled to operate in quasi-resonant switching which is triggered when a target locked valley is detected. Compared to the prior art, quasi-resonant switching technique and zero voltage switching technique are both introduced in the present invention. On the one hand, the auxiliary switch is turned on when the voltage drop VDSA is at a minimum (e.g., in the target locked valley) in order to minimize the switching losses, meanwhile the quasi-resonant switching with valley lock can operate along with change in voltage or current, and thus reducing the EMI. On the other hand, the energy reverse-stored in the transformer T1 discharges the capacitance of the primary switch MP until the voltage drop VDSP falls to zero (rather than just a minimum), before the turning-on of the primary switch MP, which allows the primary switch MP to turn on in a lossless manner. Accordingly, significant improvements in efficiency can be obtained.

Figure 2:
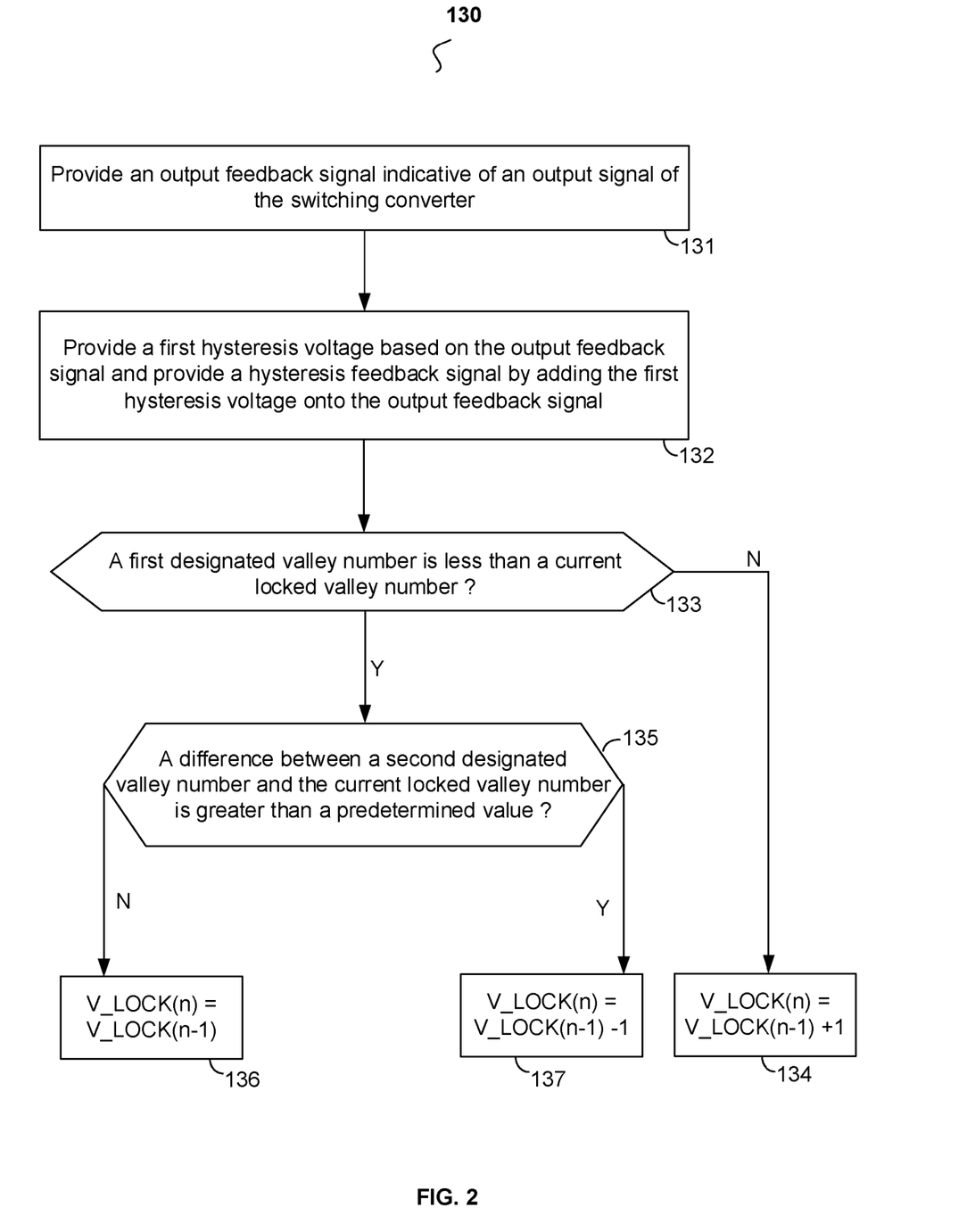
FIG. 2 illustrates a workflow for a method 130 of generating a target locked valley number in accordance with an embodiment of the present invention.

FIG. 2 illustrates a workflow for a method 130 of generating a target locked valley number in accordance with an embodiment of the present invention. As shown in FIG. 2, the method 130 of generating the target locked valley number comprises steps 131-137.

At step 131, an output feedback signal is provided by sensing an output signal (e.g. output voltage, output current or output power) of the switching converter.

At step 132, a first hysteresis voltage is generated based on the output feedback signal, and then a hysteresis feedback signal is generated based on the output feedback signal and the first hysteresis voltage. In one embodiment, the hysteresis feedback signal is generated by adding the first hysteresis voltage onto the output feedback signal. In another embodiment, the hysteresis feedback signal is generated by subtracting the first hysteresis voltage from the output feedback signal. In a further embodiment, the first hysteresis voltage is further dependent on an input line voltage, and varies with the input line voltage of the switching converter. In one embodiment, the first hysteresis voltage has different values when the input line voltages are different.

At step 133, determining whether a first designated valley number is less than the current locked valley number. Wherein the first designated valley number is designed to be the valley number when the ramp signal decreases to reach the hysteresis feedback signal. If the determination is no, go step 134. Otherwise, go step 135.

At step 134, the target locked valley number is increased. In one embodiment, the target locked valley number is equal to the current locked valley number plus 1.

At step 135, determining whether a difference between a second designated valley number and the current locked valley number is greater than a predetermined value m. Wherein the second designated valley number is the valley number when the ramp signal decreases to reach the output feedback signal. If the determination is no, go step 136. Otherwise, go step 137.

At step 136, the target locked valley number is kept unchanged and is equal to the current locked valley number.

At step 137, the target locked valley number is decreased. In one embodiment, the target locked valley number is equal to the current locked valley number minus 1.

With the method 130, the first hysteresis voltage can be introduced and used to determine the target locked valley number for turning on the auxiliary switch coupled to the auxiliary winding, and the parasitic capacitance of the primary switch coupled to the primary winding is discharged before the turning on of the primary switch, so as to achieve ZVS operation of the primary switch. Since the first hysteresis voltage is dependent on the input/output signal of the switching converter, the hysteresis for valley lock can be dynamically adjusted based on the input/output information of the switching converter, and then achieving fully ZVS for turning on the primary switch, and thus reducing the power loss and improving the performance. Compared with the prior valley lock control that only can be adjusted by one or more resonant periods, the present invention is more flexible, has wider adjustment range and can achieve ZVS operation of the primary switch.

Figure 3:
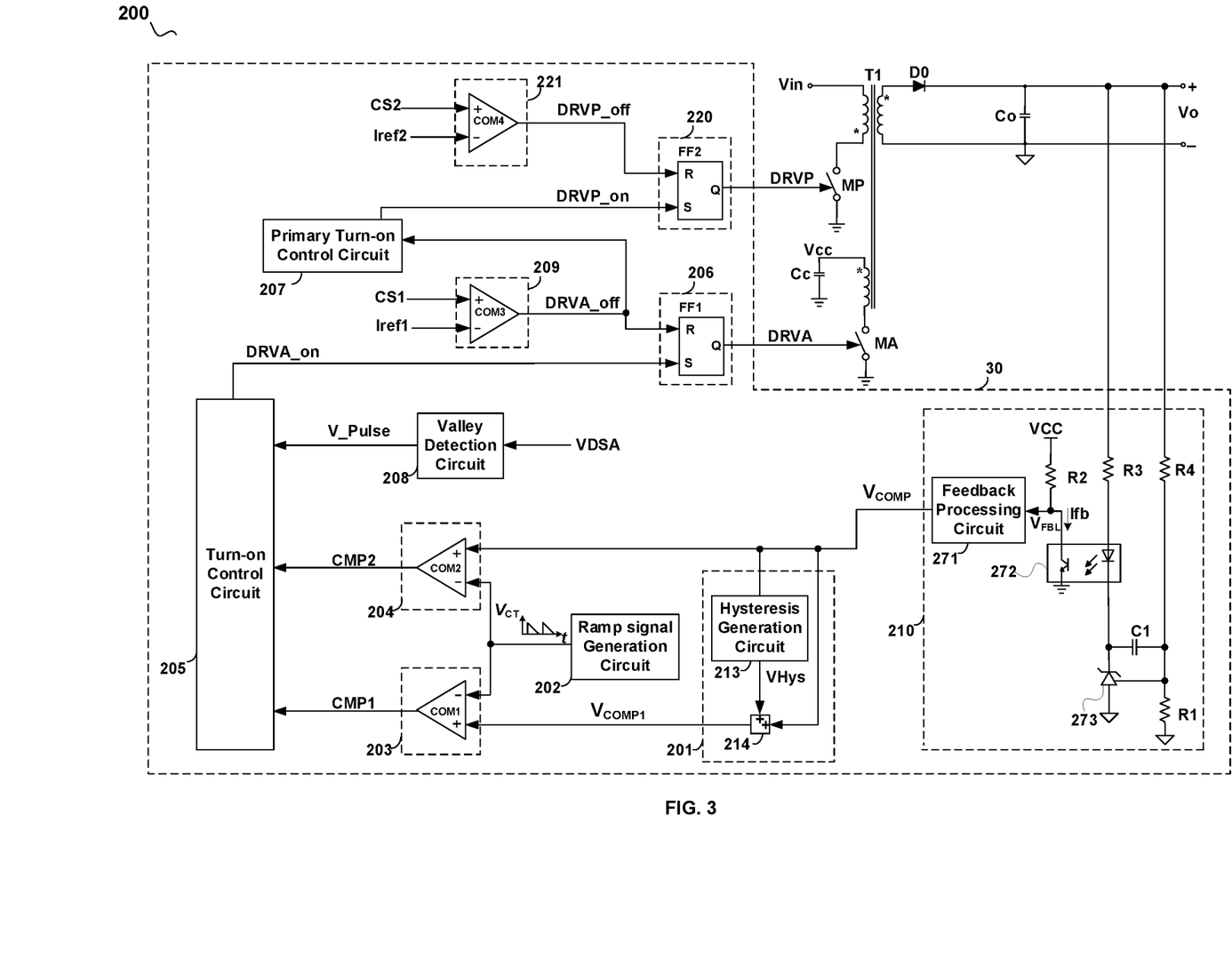
FIG. 3 illustrates a switching converter 200 in accordance with an embodiment of the present invention.

FIG. 3 illustrates a switching converter 200 in accordance with an embodiment of the present invention. As shown in FIG. 3, the switching converter 200 comprises a transformer T1 having a primary winding, a secondary winding and an auxiliary winding, a primary switch MP coupled to the primary winding of the transformer T1, an auxiliary switch MA coupled to the auxiliary winding of the transformer T1, a diode DO, an output capacitor Co, a power capacitor Cc coupled to a power supply VCC and a controller 30. In the embodiment shown in FIG. 3, the controller 30 comprises a hysteresis feedback circuit 201, a ramp signal generation circuit 202, a first comparison circuit 203, a second comparison circuit 204, a turn-on control circuit 205, a logic circuit 206, a primary turn-on control circuit 207, a valley detection circuit 208, a third comparison circuit 209, an output feedback circuit 210, a fourth comparison circuit 221 and a logic circuit 220.

As shown in FIG. 3, the output feedback circuit 210 comprise a feedback processing circuit 271, a photo coupler 272, a three-terminal regulator 273, resistors R1-R4, and a capacitor C1. A current Ifb flowing through the photosensitive element in the photo coupler 272 is generated based on an output voltage Vo of the switching converter 200, and then is converted into a feedback voltage signal $V_{FBL}$ through the resistor R2. In one embodiment, the feedback voltage signal $V_{FBL}$=VCC−Ifb*R2, wherein VCC is the power supply. The feedback processing circuit 271 is coupled to receive the feedback voltage signal $V_{FBL}$, monitors and processes the feedback voltage signal $V_{FBL}$, and generates an output feedback signal $V_{COMP}$ corresponding to different working modes of the switching converter 200. In one embodiment, the output feedback signal $V_{COMP}$=A*$V_{FBL}$+B. Wherein A is a proportional coefficient and B is an offset value. In one embodiment, if the proportional coefficient A is 1, the offset value B is 0, and the output feedback signal $V_{COMP}$=$V_{FBL}$.

The hysteresis feedback circuit 201 is configured to provide a hysteresis feedback signal $V_{COMP1}$ based on the output feedback signal $V_{COMP}$. In one embodiment, the hysteresis feedback signal $V_{COMP1}$ is proportional to the output feedback signal $V_{COMP}$. In the embodiment shown in FIG. 3, the hysteresis feedback circuit 201 comprises a hysteresis generation circuit 213 and a hysteresis processing circuit 214. The hysteresis generation circuit 213 receives the output feedback signal $V_{COMP}$, and generates a first hysteresis voltage VHys based on the output feedback signal $V_{COMP}$. The hysteresis processing circuit 214 is configured generate a hysteresis feedback signal $V_{COMP1}$ at an output terminal based on arithmetic operations of the first hysteresis voltage VHys and the output feedback signal $V_{COMP}$. In one embodiment, the hysteresis processing circuit 214 adds the first hysteresis voltage VHys onto the output feedback signal $V_{COMP}$, and provides the hysteresis feedback signal $V_{COMP1}$. In another embodiment, the hysteresis generation circuit 213 further receives an input line voltage of the switching converter 200 and provides the first hysteresis voltage VHys based on the output feedback signal $V_{COMP}$ and the input line voltage.

In the embodiment shown in FIG. 3, the ramp signal generation circuit 202 is configured to provide a ramp signal $V_{CT}$ at an output terminal. In one embodiment, the ramp signal $V_{CT}$ ramps down at a first slope during the OFF state of the primary switch MP. In other embodiments, the ramp signal $V_{CT}$ ramps down with a non-linear slope or a piecewise linear slope.

The first comparison circuit 203 comprises a comparator COM1. The non-inverting input terminal of the comparator COM1 is coupled to the hysteresis feedback circuit 201 to receive the hysteresis feedback signal $V_{COMP1}$, i.e., the sum of the output feedback signal $V_{COMP}$ and the first hysteresis voltage VHys. The inverting input terminal of the comparator COM1 is coupled to the ramp signal generation circuit 202 to receive the ramp signal $V_{CT}$, the output terminal is coupled to the turn-on control circuit 205 for providing a first comparison signal CMP1. In one embodiment, the first comparison signal CMP1 is reset to be high level when the primary switch MP is turned ON. When the ramp signal $V_{CT}$ decreases to reach the hysteresis feedback signal $V_{COMP1}$, the first comparison signal CMP1 becomes low level from high level.

The second comparison circuit 204 comprises a comparator COM2. The non-inverting input terminal of the comparator COM2 is coupled to the output feedback circuit 210 to receive the output feedback signal $V_{COMP}$. The inverting input terminal of the comparator COM2 is coupled to the ramp signal generation circuit 202 to receive the ramp signal $V_{CT}$, the output terminal is coupled to the turn-on control circuit 205 for providing a second comparison signal CMP2. In one embodiment, the second comparison signal CMP2 is reset to be high level when the primary switch MP is turned ON. When the ramp signal $V_{CT}$ decreases to reach the output feedback signal $V_{COMP}$, the second comparison signal CMP2 becomes low level from high level.

In some embodiments, to counteract the effect caused by saturation voltage of the photosensitive element, a bias voltage VOFFSET (e.g., 200 mV) is further added to the non-inverting input terminal of the comparator COM1 and the non-inverting input terminal of the comparator COM2.

Figure 4:
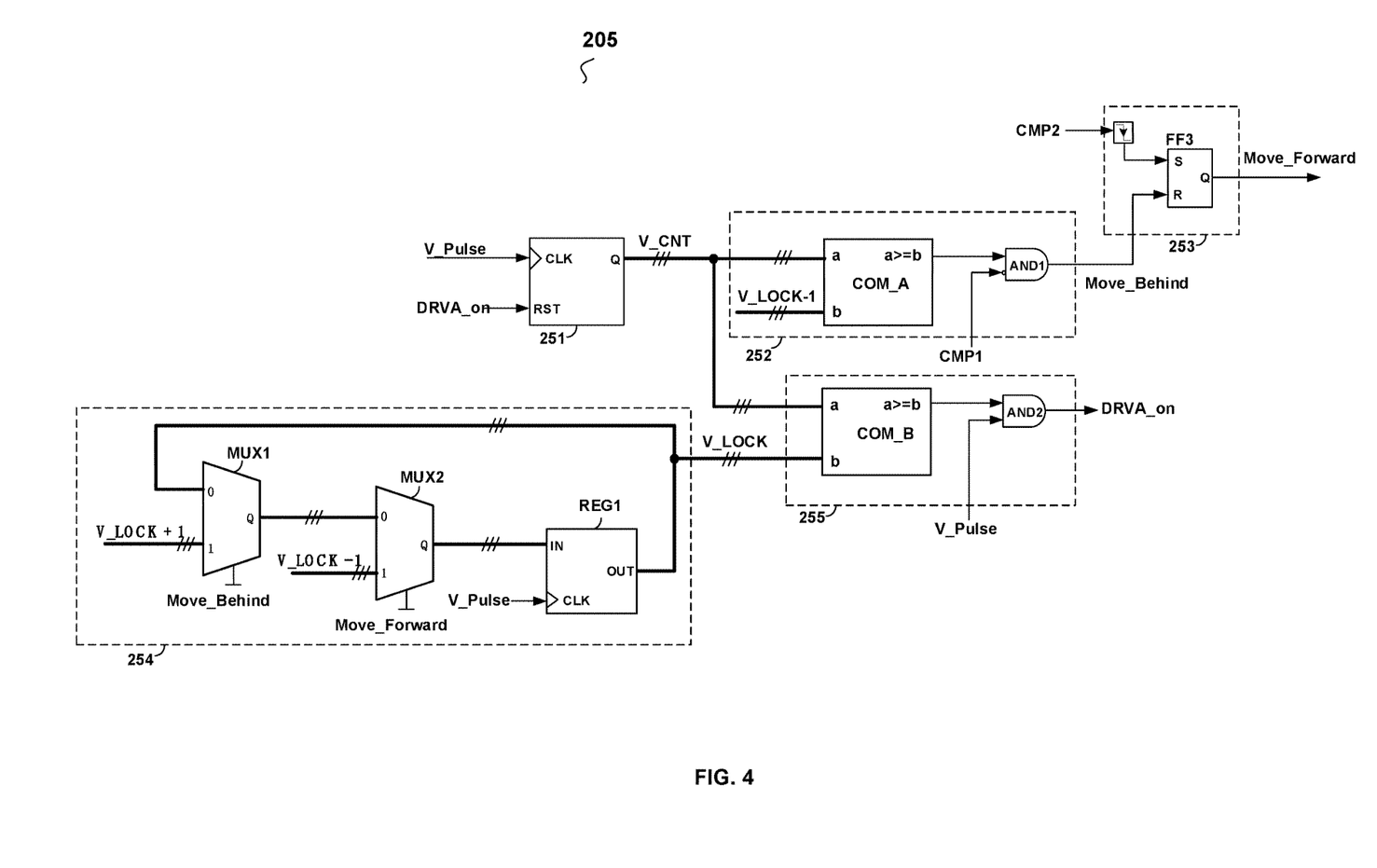
FIG. 4 illustrates a turn-on control circuit 205 shown in FIG. 3 in accordance with an embodiment of the present invention.

Several of the details of the embodiments of the turn-on control circuit described below with reference to FIG. 4 and FIG. 5. FIG. 4 illustrates a turn-on control circuit 205 shown in FIG. 3 in accordance with an embodiment of the present invention. As shown in FIG. 4, the turn-on control circuit 205 comprises a counter 251, a first determination circuit 252, a second determination circuit 253, a target locked valley number generator 254 and an enable circuit 255.

The counter 251 starts counting the number of pulses of the valley pulse signal V_Pulse when the auxiliary switch MA is turned OFF, and outputs a count value V_CNT. The first determination circuit 252 is configured to compare a first designated count value and the current locked valley number and generate a first indicium signal Move_Behind, to determine whether to increase the target locked valley number. Wherein the first designated count value is the count value when the ramp signal $V_{CT}$ decrease to reach the hysteresis feedback signal $V_{COMP1}$, i.e., the count value when the first comparison signal CMP1 becomes low level from high level.

In the embodiment shown in FIG. 4, the first determination circuit 252 comprises a first digital comparator COM_A and a first AND gate circuit AND1. The first digital comparator COM_A has a first input terminal, a second input terminal and an output terminal, wherein the first input terminal is configured to receive the count value V_CNT, the second input terminal is configured to receive the current locked valley number minus one. The first AND gate circuit AND1 has a first input terminal coupled to the output terminal of the first digital comparator COM_A, a second input terminal to receive the first comparison signal CMP1, an output terminal for providing the first indicium signal Move_Behind. In one embodiment, the target locked valley number generator 254 is configured to provide the target locked valley number based on the first indicium signal Move_Behind.

The second determination circuit 253 is configured to compare a difference between a second designated count value and the current locked valley number with a predetermined value m, and generate a second indicium signal Move_Forward, to determine whether to decrease the target locked valley number. Wherein the second designated count value is the count value when the ramp signal $V_{CT}$ decrease to reach the output feedback signal $V_{COMP}$. In one embodiment, the predetermined value m is an integer greater than 1. In the embodiment shown in FIG. 4, the second determination circuit 253 comprises a flip-flop 253.

The flip-flop FF3 has a reset terminal to receive the first indicium signal Move_Behind, a set terminal to receive the second comparison signal CMP2 through a falling-edge trigger, and an output terminal configured to provide the second indicium signal Move_Forward.

In another embodiment, the target locked valley number generator 254 is configured to provide the target locked valley number based on the first indicium signal Move_Behind, the second indicium signal Move_Forward and the current locked valley number. The target locked valley number generator 254 comprises a first multiplexer MUX1, a second multiplexer MUX2, and a register REG1.

The first multiplexer MUX1 is configured to select the current locked valley number V_LOCK(n−1) or V_LOCK(n−1)+1 as a first output value provided at an output terminal, according to the first indicium signal Move_Behind. The second multiplexer MUX2 is configured to select the first output value provided by the first multiplexer MUX1 or V_LOCK(n−1)-1 as a second output value provided at an output terminal. The register REG1 is configured to update and output the target locked valley number V_LOCK(n) when the valley pulse signal V_Pulse arrives.

In other words, the first designated valley number is the valley number when the ramp signal $V_{CT}$ decreases to reach the hysteresis feedback signal $V_{COMP1}$, if the first designated count value is greater than or equal to the current locked valley number V_LOCK(n−1), the target locked valley number V_LOCK(n) will increase by 1. Otherwise, the target locked valley number V_LOCK(n) will be kept to equal to the current locked valley number V_LOCK (n−1). Furthermore, if the difference between the second designated count value and the current locked valley number V_LOCK(n−1) is greater than the predetermined value m (e.g., m=1), the target locked valley number V_LOCK(n) will decrease by 1.

The enable circuit 255 is configured to provide the turning on control signal DRVA_on at an output terminal when the count value V_CNT is counted to reach the target locked valley number V_LOCK(n) and the valley pulse signal V_Pulse arrives. As shown in FIG. 4, the second digital comparator COM_B is configured to compare the count value V_CNT with the target locked valley number V_LOCK(n), and the second AND gate AND2 outputs the turning on control signal DRVA_on when the count value V_CNT is counted to reach the target locked valley number V_LOCK(n).

Referring now to FIG. 3, the third comparison circuit 209 comprises a comparator COM3. The non-inverting input terminal of the comparator COM3 is configured to receive a first current sensing signal CS1 indicative of a first current flowing through the auxiliary switch MA, the inverting input terminal is coupled to a threshold generator to receive a first threshold voltage Iref1, the output terminal is configured to provide a turning off control signal DRVA_off.

The logic circuit 206 comprises a flip-flop FF1. The flip-flop FF1 has a set terminal, a reset terminal and an output terminal, wherein the set terminal is coupled to the output terminal of the turn-on control circuit 205 to receive the turning on control signal DRVA_on. The reset terminal is coupled to the third comparison circuit 209 to receive the turning off control signal DRVA_off. The output terminal is coupled to a control terminal of the auxiliary switch MA for providing a control signal DRVA.

In the embodiment shown in FIG. 3, the primary turn-on control circuit 207 is configured to provide a primary turning on control signal DRVP_on at an output terminal after the auxiliary switch MA is turned off and before the primary switch MP is turned on. In detail, the primary turn-on control circuit 207 is configured to detect whether the voltage drop VDSP is less than the valley threshold voltage, i.e., whether the voltage VDSP is in its minimum, and provide the primary turning-on control signal DRVP_on. In another embodiment, the primary turn-on control circuit 207 is configured to detect whether the voltage drop VDSP is decreased to zero after the auxiliary switch MA is turned off and before the primary switch MP is turned on, and provide the primary turning on control signal DRV_on to control the primary switch MP to turn on.

The fourth comparison circuit 221 comprises a comparator COM4. The non-inverting input terminal of the comparator COM4 is configured to receive a second current sensing signal CS2 indicative of a second current flowing through the primary switch MP, the inverting input terminal is coupled to a second threshold generator to receive a second threshold voltage Iref2, the output terminal is configured to provide a primary turning off control signal DRVP_off. The logic circuit 220 comprises a flip-flop FF2. The flip-flop FF2 has a set terminal, a reset terminal and an output terminal, wherein the set terminal is coupled to the output terminal of the primary turn-on control circuit 207 to receive the turning on control signal DRVP_on. The reset terminal is coupled to the fourth comparison circuit 221 to receive the primary turning off control signal DRVP_off. The output terminal is coupled to a control terminal of the primary switch MP for providing a primary control signal DRVP.

Figure 5:
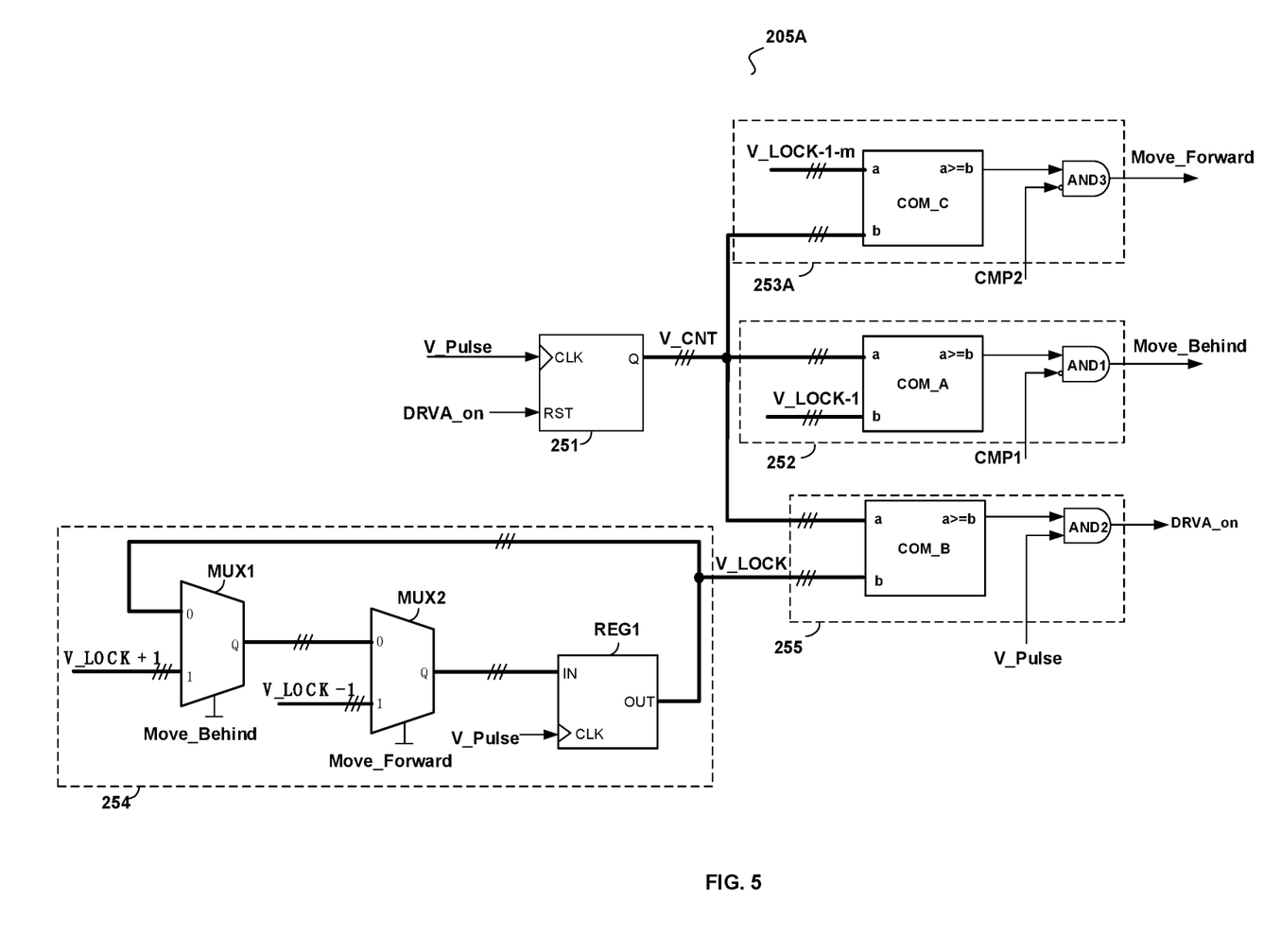
FIG. 5 illustrates a turn-on control circuit 205A shown in FIG. 3 in accordance with another embodiment of the present invention.

Referring now to FIG. 5, FIG. 5 illustrates a turn-on control circuit 205A shown in FIG. 3 in accordance with another embodiment of the present invention. Compared with the turn-on control circuit 205 shown in FIG. 4, the second determination circuit 253A shown in FIG. 5 is different from the second determination circuit 253 shown in FIG. 4.

In the embodiment shown in FIG. 5, the second determination circuit 253 is configured to determine whether a difference between the current locked valley number and the predetermined value m is greater than the second designated valley count, and then provide the second indicium signal Move_Forward based on the determination. Wherein second designated count value is the count value when the falling-edge of the second comparison signal CMP2 arrives. In the embodiment shown in FIG. 5, The second determination circuit 253A comprises a third digital comparator COM_C and a third AND gate AND3.

According to the method 130 illustrated in FIG. 2, if the first designated valley number is greater than the current locked valley number, the target locked valley number increases. Otherwise, the target locked valley number will keep the current locked valley number or decrease. Furthermore, if the difference between the current locked valley number and the predetermined value m is higher than the second designated valley number, the target locked valley number decreases. Otherwise, the target locked valley number will remain the current locked valley number.

Figure 6:
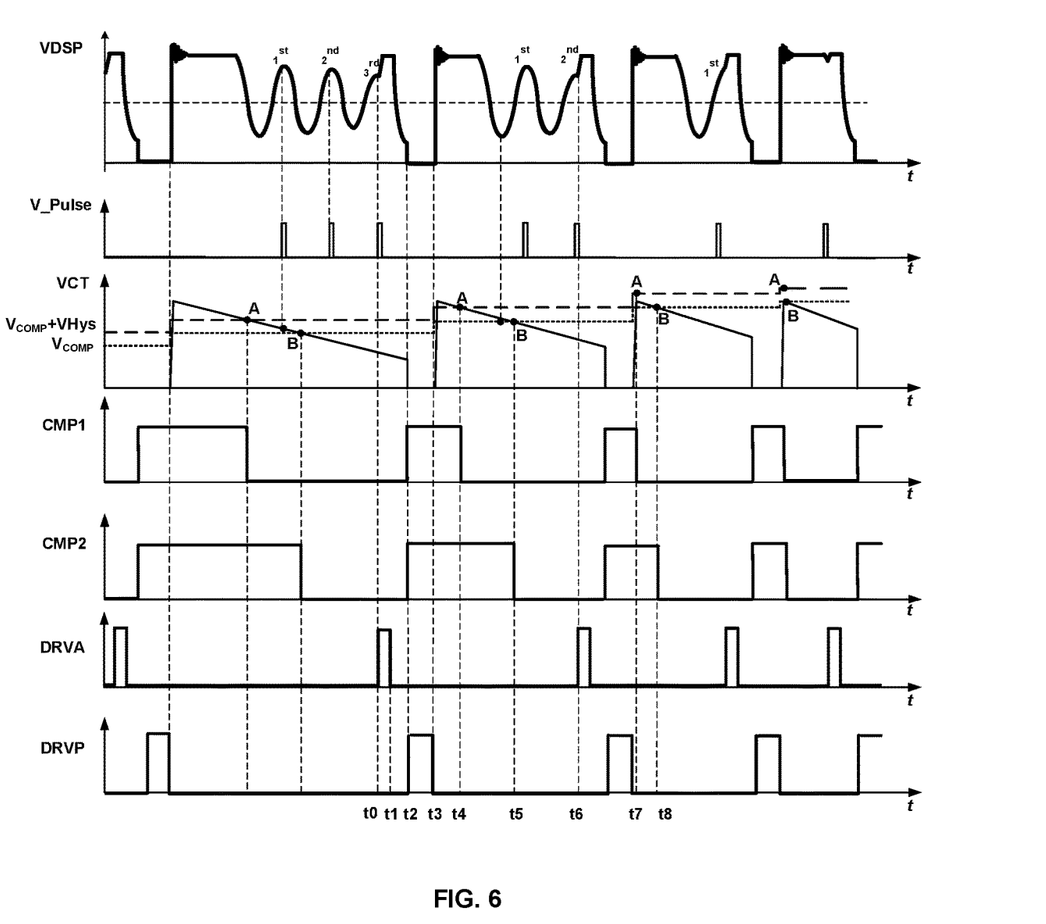
FIG. 6 illustrates working waveforms of the switching converter 200 in accordance with an embodiment of the present invention.

FIG. 6 illustrates working waveforms of the switching converter 200 in accordance with an embodiment of the present invention. As shown in FIG. 6, during the OFF state of the primary switch MP, the voltage drop VDSP across the primary switch MP resonant to above a peak, the valley detection circuit 205 is configured to provide the valley pulse signal V_Pulse indicative of peaks of the voltage drop VDSP. In one embodiment, when the voltage drop VDSP increases to the peak voltage, the valley detection circuit 208 provides the valley pulse signal V_Pulse.

As shown in FIG. 6, at time t0, the auxiliary switch MA is turned on at a fourth valley, thus the current locked valley number is 4. The counter 251 starts counting the number of the pulses of the valley pulse signal V_Pulse. At time t1, the first current sensing signal CS1 indicative of the first current flowing through the auxiliary switch MA increases to the first threshold voltage Iref1, the auxiliary switch MA is turned OFF. During time period t1-t2, the primary turn-on control circuit 207 detects that the voltage drop VDSP decreases to below the valley threshold voltage, and the primary control signal DRVP becomes high, and the primary switch MP is turned on with zero-voltage switching. At the same time, both the first comparison signal CMP1 and the second comparison signal CMP2 are reset to be high level. At time, t3, the primary switch MP is turned off, the output feedback signal $V_{COMP}$ and the hysteresis feedback signal $V_{COMP1}$ increases with the decrease of the output load. Subsequently, the ramp signal $V_{CT}$ starts to decrease at a slope.

At time t4, the ramp signal $V_{CT}$ decrease to reach the hysteresis feedback signal $V_{COMP1}$ (i.e., $V_{COMP}$+VHys). As shown at point A, the first comparison signal CMP1 becomes low level from high level, and the count value V_CNT at that time is 1, which is less than the current locked valley number, and thus the target locked valley number will not increase.

At time t5, the ramp signal $V_{CT}$ decrease to reach the output feedback signal $V_{COMP}$ (point B as shown). The second comparison signal CMP2 becomes low level from high level, and the count value V_CNT at point B is 2, which is equal to a difference between the current locked valley number and the predetermined value (e.g., 2), and the target locked valley number will increase by 1.

At time, t6, the auxiliary switch MA is turned on at a third valley, and the current locked valley number is 3. After that, at time t7, the ramp signal $V_{CT}$ decrease to reach the hysteresis feedback signal $V_{COMP1}$ again. The count value at point A is 0, and is less than the current locked valley number, and the target locked valley number will not increase. At time t7, the count value at point B is 1, and is equal to the difference between the current locked valley number and the predetermined value. Accordingly, the target locked valley number will increase by 1 and the auxiliary switch MA will be turned on at a second valley for next turning on.

Figure 7:
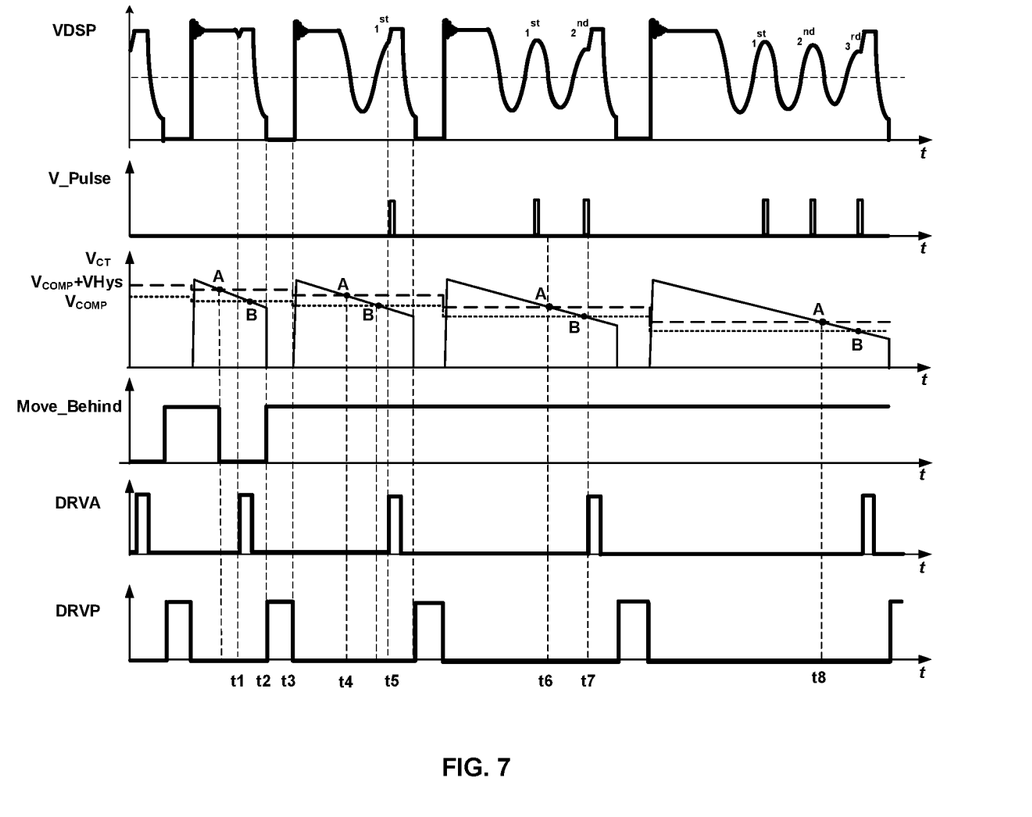
FIG. 7 illustrates working waveforms of the switching converter 200 in accordance with another embodiment of the present invention.

FIG. 7 illustrates working waveforms of the switching converter 200 in accordance with another embodiment of the present invention. In the embodiment shown in FIG. 7, the output feedback signal $V_{COMP}$ decreases as the output load becomes heavier.

As shown in FIG. 7, at time t1, the current locked valley number of the auxiliary switch MA is 1. After the auxiliary switch MA is turned off, the primary turn-on control circuit 207 starts detecting the voltage drop VDSP. When the voltage VDSP is less than the valley threshold voltage, the primary switch MP is turned on, as shown at time t2. At time t3, the primary switch MP is turned off. The turn-on control circuit 205 starts counting the number of the pulses of the valley pulse signal V_Pulse, and the ramp signal $V_{CT}$ starts to decrease.

At time t4, the ramp signal $V_{CT}$ decrease to reach the hysteresis feedback signal $V_{COMP1}$. The comparison signal CMP1 becomes low level from high level, the count value V_CNT at point A is 1 and is equal to the current locked valley number. And thus the first indicium signal Move_Behind keeps high level, and the target locked valley number will increase to 2. And the second determination circuit 253 is disabled.

At time t6, the auxiliary switch MA is turned on at a second valley, and the current locked valley number is 2. At time t6, the count value at point A is 2 and is equal to the current locked valley number. And thus the first indicium signal Move_Behind keeps high level, and the target locked valley number will increase to 3.

Similarly, at time t7, the auxiliary switch MA is turned on at the third valley. At time t8, the count value V_CNT at point A is 3 and is equal to the current locked valley number. Accordingly, the target locked valley number will increase to 4.

Figure 8:
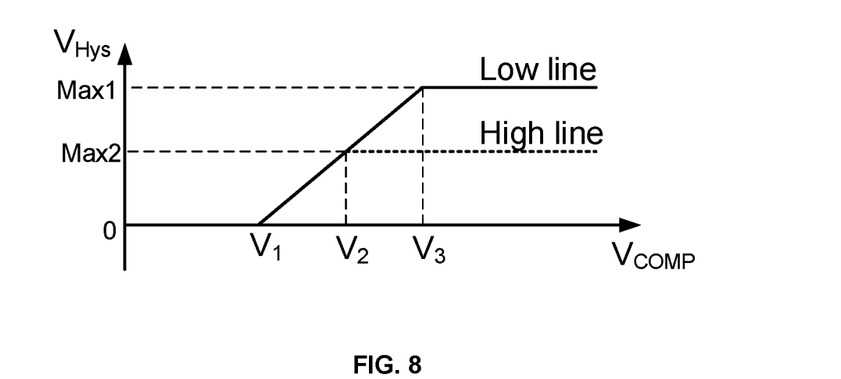
FIG. 8 illustrates a relationship curve of a first hysteresis voltage and an output feedback signal in accordance with an embodiment of the present invention.

FIG. 8 illustrates a relationship curve of a first hysteresis voltage and an output feedback signal in accordance with an embodiment of the present invention. As shown in FIG. 8, the first hysteresis voltage VHys and the output feedback signal $V_{COMP}$ have the following relationships. In one embodiment, the first hysteresis voltage VHys has a first maximum value Max1 when the output feedback signal $V_{COMP}$ is greater than a first feedback voltage V1 and the input line voltage is low. In another embodiment, the first hysteresis voltage VHys has a second maximum value Max2 when the output feedback signal $V_{COMP}$ is greater than a third feedback voltage V3 and the input line voltage is high. The first hysteresis voltage VHys decreases as the output feedback signal $V_{COMP}$ decreases when the output feedback signal $V_{COMP}$ is between the first feedback voltage V1 and a second feedback voltage V2. And the first hysteresis voltage VHys has a minimum value (e.g., 0) when the output feedback signal $V_{COMP}$ is less than the second feedback voltage V2.

Figure 9:
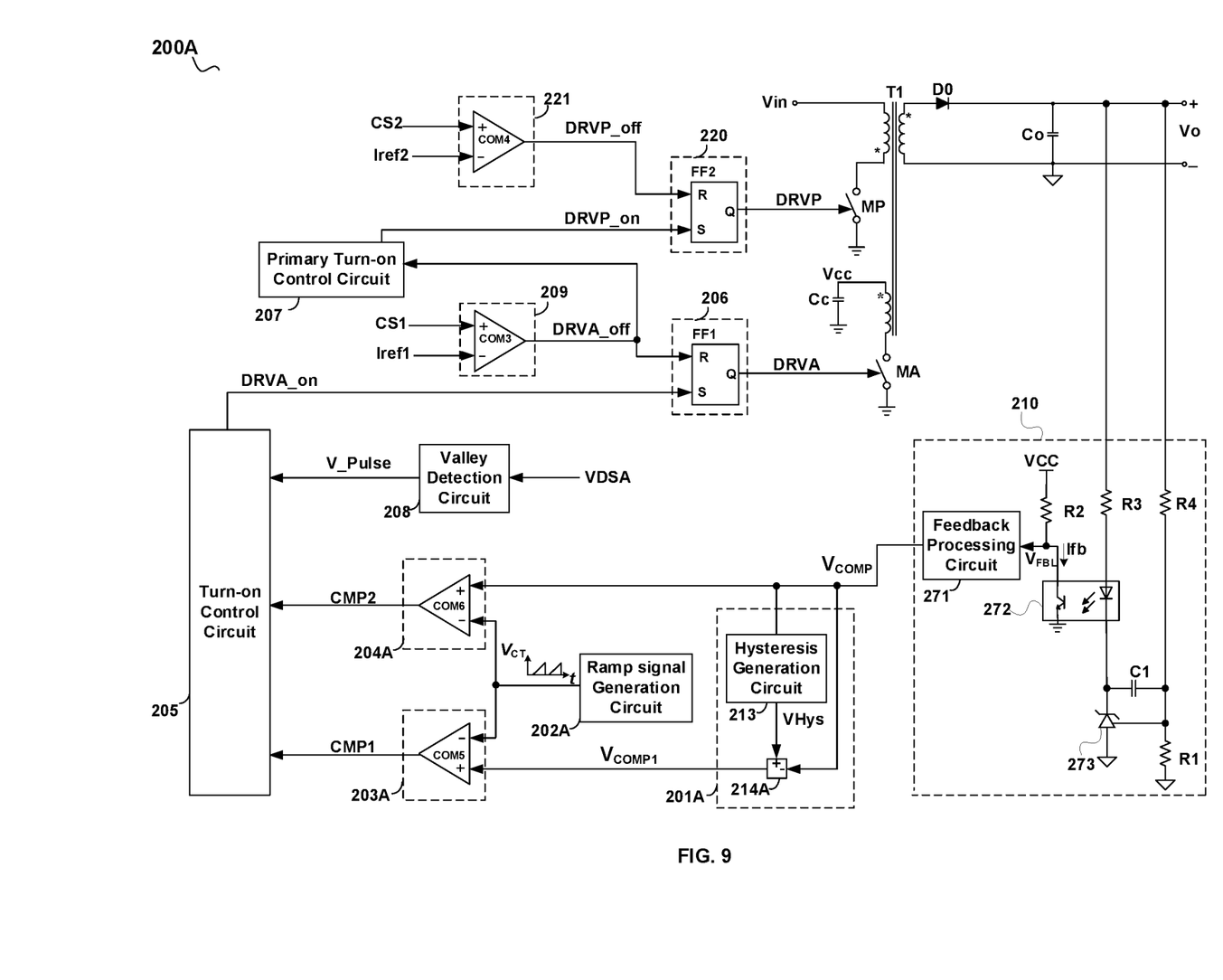
FIG. 9 illustrates a switching converter 200A in accordance with another embodiment of the present invention.

FIG. 9 illustrates a switching converter 200A control in accordance with another embodiment of the present invention. Compared with the switching converter 200 shown in FIG. 3, the difference is that the switching converter 200A has a different hysteresis feedback circuit 201A, a ramp signal generation circuit 202A, a first comparison circuit 203A and a second comparison circuit 204A. The hysteresis feedback circuit 201A comprises a hysteresis generation circuit 213 and a subtracter 214A. The hysteresis feedback circuit 201A provides the hysteresis feedback signal VCMOP1 by subtracting the first hysteresis voltage VHys from the output feedback signal $V_{COMP}$. The ramp signal generation circuit 202A provides a ramp signal $V_{CT}$ which increases with a second slope during the OFF state of the primary switch MP.

The first comparison circuit 203A comprise a comparator COM5. The non-inverting input terminal of the comparator COM5 is coupled to the hysteresis feedback circuit 201 to receive the hysteresis feedback signal $V_{COMP1}$, i.e., the difference between the output feedback signal $V_{COMP}$ and the first hysteresis voltage VHys. The inverting input terminal of the comparator COM5 is coupled to the ramp signal generation circuit 202A to receive the ramp signal $V_{CT}$, the output terminal is coupled to the turn-on control circuit 205 for providing the first comparison signal CMP1. In one embodiment, when the ramp signal $V_{CT}$ increases to reach the hysteresis feedback signal $V_{COMP1}$, the first comparison signal CMP1 becomes low level from high level.

The second comparison circuit 204A comprise a comparator COM6. The non-inverting input terminal of the comparator COM6 is coupled to the output feedback circuit 207 to receive the output feedback signal $V_{COMP}$. The inverting input terminal of the comparator COM6 is coupled to the ramp signal generation circuit 202A to receive the ramp signal $V_{CT}$, the output terminal is coupled to the turn-on control circuit 205 for providing the second comparison signal CMP2. In one embodiment, when the ramp signal $V_{CT}$ increases to reach the output feedback signal $V_{COMP}$, the second comparison signal CMP2 becomes low level from high level.

Figure 10:
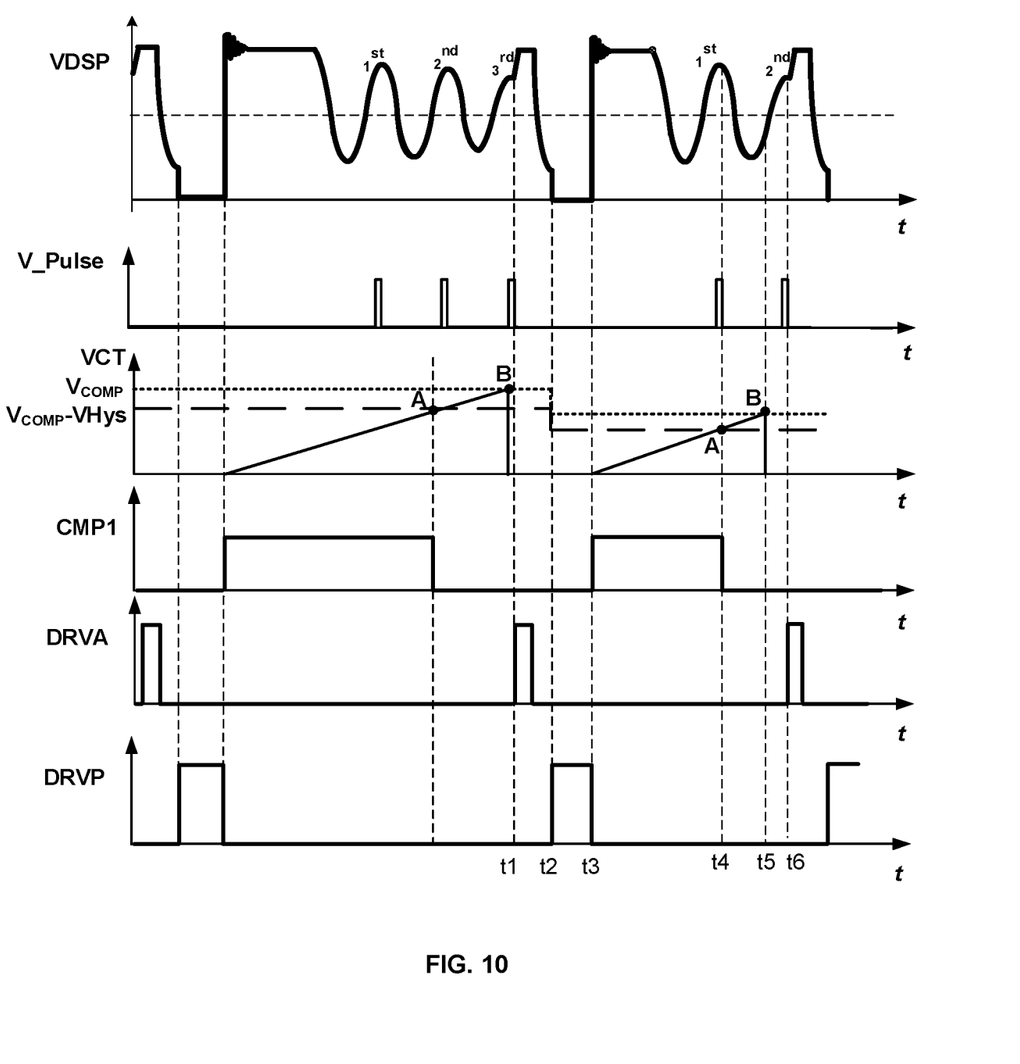
FIG. 10 illustrates working waveforms of the switching converter 200A in accordance with an embodiment of the present invention.

FIG. 10 illustrates working waveforms of the switching converter 200A in accordance with an embodiment of the present invention. As shown in FIG. 10, at time t1, the auxiliary switch MA is turned on at the third peak of the voltage drop VDSP, and thus at the fourth valley of the voltage drop VDSA. Accordingly, the current locked valley number is 4. At time t2, the primary switch MP is turned on at a minimum of the voltage drop VDSP, to achieve ZVS operation. Subsequently, at time t3, the primary switch MP is turned off, and the ramp signal $V_{CT}$ starts to ramp up with a slope. At time t4, the count value V_CNT at point A is 2, which is less than the current locked valley number, so the target locked valley number will not increase. At time t5, the count value V_CNT at point B is 2, the difference between the current locked valley number and the count value is 2, so the target locked valley number will decrease by 1. Then at time t6, the auxiliary switch MA is turned on at the third valley.

Figure 11:
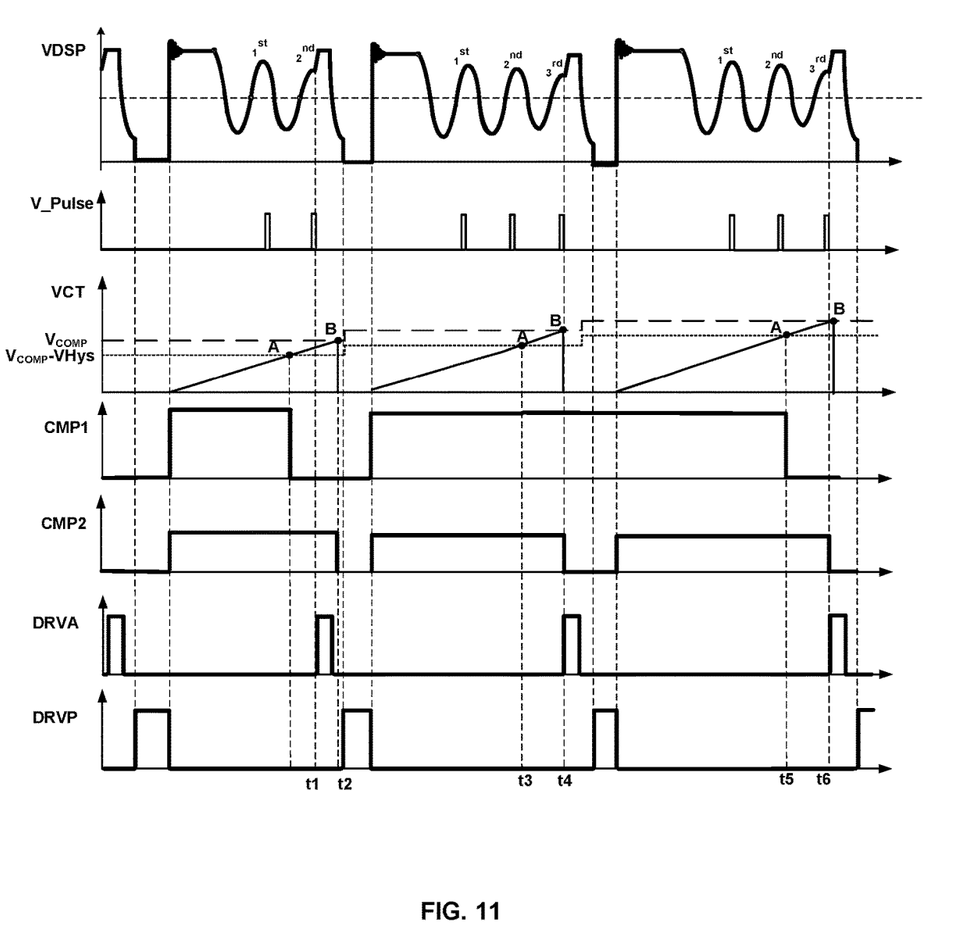
FIG. 11 illustrates working waveforms of the switching converter 200A in accordance with another embodiment of the present invention.

FIG. 11 illustrates working waveforms of the switching converter 200A in accordance with another embodiment of the present invention. As shown in FIG. 11, at time t1, the auxiliary switch MA is turned on with the quasi-resonant switching at the third valley, the current locked valley number is 3. At time t2, the primary switch MP is turned on with zero-voltage switching. At time t3, the count value V_CNT at point A is 3, which equals with the current locked valley number. And thus the target valley number will increase to 4. At time t5, the count value V_CNT at point A is 3, which is less than the current locked valley number. Accordingly, the target valley number will not increase. Subsequently, the auxiliary switch MA is turned on at a fourth valley.

The embodiments discussed above are all related to switching converters that have quasi-resonant control and zero-voltage switching control. The embodiments of the present invention also can be applied to a switching converter that can work in multi-mode including both CCM, QR mode and/or DCM.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller used in a switching converter having a transformer, a first switch coupled to a primary winding of the transformer, a second switch coupled to an auxiliary winding of the transformer, the controller comprising:
   an output feedback circuit configured to receive an output signal of the switching converter and generate an output feedback signal;
   a hysteresis feedback circuit configured to generate a hysteresis feedback signal based on the output feedback signal;
   a first comparison circuit configured to compare the hysteresis feedback signal with a ramp signal and generate a first comparison signal;
   a second comparison circuit configured to compare the output feedback signal with the ramp signal and generate a second comparison signal;
   a valley detection circuit configured to provide a valley pulse signal in response to one or more valleys of a voltage drop across the second switch during an OFF state of the second switch;
   a turn-on control circuit configured to generate a target locked valley number based on the valley pulse signal, the first comparison signal, the second comparison signal and a current locked valley number, and further configured to generate a turning on control signal corresponding to the target locked valley number for turning ON the second switch; and
   a primary turn-on control circuit configured to provide a primary turning on control signal to turn on the first switch after the second switch is turned off.

2. The controller of claim 1, further comprising:
   a third comparison circuit configured to compare a first current sensing signal indicative of a first current flowing through the second switch and a first threshold voltage and generate a turning off control signal for turning off the second switch.

3. The controller of claim 2, further comprising:
   a fourth comparison circuit configured to compare a second current sensing signal indicative of a second current flowing through the first switch and a second threshold voltage and generate a primary turning off control signal for turning off the first switch.

4. The controller of claim 1, wherein:
   the hysteresis feedback circuit is configured provide the hysteresis feedback signal by adding a first hysteresis voltage onto the output feedback signal; and
   wherein the ramp signal ramps down during an OFF state of the first switch.

5. The controller of claim 1, wherein the turn-on control circuit comprises:
   a counter having a clock terminal to receive the valley pulse signal, a reset terminal to receive the turning on control signal and an output terminal for providing a count value;
   a first determination circuit configured to compare a first designated count value and the current locked valley number and generate a first indicium signal, to determine whether to increase the target locked valley number, wherein the first designated count value is the count value when the ramp signal reaches the hysteresis feedback signal;

a target locked valley number generator configured to provide the target locked valley number based on the first indicium signal; and an enable circuit configured to provide the turning on control signal when the count value reaches the target locked valley number and the valley pulse signal arrives.

6. The controller of claim 5, wherein:

when the first designated count value is greater than or equal to the current locked valley number, the target locked valley number increases by 1; and when the first designated count value is less than the current locked valley number, the target locked valley number keeps unchanged.

7. The controller of claim 5, wherein the turn-on control circuit further comprises:

a second determination circuit configured to compare a difference between a second designated count value and the current locked valley number with a predetermined value, and generate a second indicium signal, to determine whether to decrease the target locked valley number, wherein the second designated count value is the count value when the ramp signal reaches the output feedback signal; and wherein the target locked valley number generator is configured to provide the target locked valley number based on the first indicium signal and the second indicium signal.

8. The method of claim 7, wherein:

when the difference between the second designated count value and the current locked valley number is greater than the predetermined value, the target locked valley number decreases by 1; and when the difference is less than the predetermined value, the target locked valley number keeps unchanged.

9. The controller of claim 1, wherein:

the hysteresis feedback circuit is configured to provide the hysteresis feedback signal by subtracting a second hysteresis voltage from the output feedback signal; and wherein the ramp signal ramps up during the OFF state of the first switch.

10. The controller of claim 1, wherein:

the primary turn-on control circuit is configured to detect a voltage drop across the first switch during the OFF state of the first switch, and determine whether the voltage drop across the first switch is less than a first reference voltage, and provide the primary turning on control signal based on the determination.

11. A switching converter, comprising:

a transformer having a primary winding, a secondary winding and an auxiliary winding;

a first switch coupled to the primary winding;

a second switch coupled to the auxiliary winding;

an output feedback circuit configured to generate an output feedback signal based on an output signal of the switching converter;

a hysteresis feedback circuit configured to generate a hysteresis feedback signal based on the output feedback signal;

a first comparison circuit configured to compare the hysteresis feedback signal with a ramp signal and generate a first comparison signal;

a second comparison circuit configured to compare the output feedback signal with the ramp signal and generate a second comparison signal;

a valley detection circuit configured to provide a valley pulse signal in response to one or more valleys of a voltage drop across the second switch during an OFF state of the second switch;

a turn-on control circuit configured to generate a target locked valley number based on the valley pulse signal, the first comparison signal, the second comparison signal and a current locked valley number, and further configured to generate a turning on control signal corresponding to the target locked valley number for turning ON the second switch; and a primary turn-on control circuit configured to provide a primary turning on control signal to turn on the first switch after the second switch is turned off.

12. The switching converter of claim 11, wherein:

the hysteresis feedback circuit is configured to provide a first hysteresis voltage based on the output feedback signal and provide the hysteresis feedback signal by adding the first hysteresis voltage onto the output feedback signal; and wherein the ramp signal ramps down during an OFF state of the first switch.

13. The switching converter of claim 11, wherein the turn-on control circuit comprises:

a counter having a clock terminal to receive the valley pulse signal, a reset terminal to receive the turning on control signal and an output terminal for providing a count value;

a first determination circuit configured to generate a first indicium signal for determining whether to increase the target locked valley number by comparing a first designated count value when the ramp signal reaches the hysteresis feedback signal with the current locked valley number;

a second determination circuit configured to generate a second indicium signal to determine whether to decrease the target locked valley number by comparing a difference between a second designated count value and the current locked valley number with a predetermined value, and wherein the second designated count value is the count value when the ramp signal reaches the output feedback signal; and a target locked valley number generator configured to provide the target locked valley number based on the first indicium signal and the second indicium signal.

14. The switching converter of claim 13, wherein:

when the first indicium signal is at a first level, the target locked valley number increases by 1; and when the second indicium signal is at the first level, the target locked valley number decreased by 1; and when the first indicium signal is at a second level and the second indicium signal is at the second level, the target locked valley number keeps unchanged.

15. The switching converter of claim 11, wherein:

the hysteresis feedback circuit is configured to provide a second hysteresis voltage based on the output feedback signal and provide the hysteresis feedback signal by subtracting the second hysteresis voltage from the output feedback signal; and wherein the ramp signal ramps up during the OFF state of first switch.

16. A control method of a switching converter having a transformer, a first switch coupled to a primary winding of the transformer, a second switch coupled to an auxiliary winding of the transformer, the control method comprising:

generating an output feedback signal based on an output signal of the switching converter;

generating a hysteresis feedback signal based on the output feedback signal;

comparing the hysteresis feedback signal with a ramp signal and generating a first comparison signal;

comparing the output feedback signal with the ramp signal and generating a second comparison signal;

detecting valleys of a voltage drop across the second switch during an OFF state of the second switch and generating a valley pulse signal;

generating a target locked valley number based on the valley pulse signal, the first comparison signal, the second comparison signal and a current locked valley number;

generating a turning on control signal corresponding to the target locked valley number for turning on the second switch; and providing a primary turning on control signal to turn on the first switch after the second switch is turned off.

17. The control method of claim 16, wherein generating the target locked valley number comprising:

determining whether to increase the target locked valley number by comparing a first designated valley number when the ramp signal reaches the hysteresis feedback signal with the current locked valley number; and determining whether to decrease the target locked valley number by comparing a difference between a second designated valley number and the current locked valley number with a predetermined value, and wherein the second designated valley number is a valley number when the ramp signal reaches the output feedback signal.

18. The control method of claim 16, wherein generating the hysteresis feedback signal comprising:

providing a first hysteresis voltage based on the output feedback signal; and providing the hysteresis feedback signal by adding the first hysteresis voltage onto the output feedback signal.

19. The control method of claim 17, wherein:

when the first designated valley number is greater than or equal to the current locked valley number, the target locked valley number increases by 1; and when the difference between the second designated valley number and the current locked valley number is greater than the predetermined value, the target locked valley number decreases by 1.

20. The control method of claim 16, wherein generating the hysteresis feedback signal comprising:

providing a second hysteresis voltage based on the output feedback signal; and providing the hysteresis feedback signal by subtracting the second hysteresis voltage from the output feedback signal.

\* \* \* \* \*